P. H. DODGE.
RESILIENT STEEL VEHICLE WHEEL.
APPLICATION FILED JUNE 21, 1918.

1,364,187.

Patented Jan. 4, 1921.

Witnesses:

Inventor:
Paul H. Dodge

UNITED STATES PATENT OFFICE.

PAUL H. DODGE, OF CHICAGO, ILLINOIS.

RESILIENT STEEL VEHICLE-WHEEL.

1,364,187.   Specification of Letters Patent.   Patented Jan. 4, 1921.

Application filed June 21, 1918. Serial No. 241,183.

*To all whom it may concern:*

Be it known that I, PAUL H. DODGE, a citizen of the United States of America, and a resident of Chicago, Illinois, (care Willis, 818 East 58th street; permanent address, Goshen, Indiana,) have invented a new and useful Metallic Wheel, of which the following is a full and exact description and specification.

My invention relates to resilient steel vehicle wheels, and primarily to steel car wheels for railroads.

The general object of my invention is to provide a simple and practical, unitary, resilient steel vehicle wheel, which shall combine great strength with a certain degree of elasticity; and to secure the maximum of elasticity desired at or near the middle of the spokes, and a maximum of strength with less distortion at or near the ends of the spokes, where the strain and tendency to fracture is ordinarily greatest; and to avoid the objectionable features of multiplicity of parts and disintegration of parts, and the use of destructible, derangeable and non-metallic substances.

The principal use and application intended for my steel or metallic wheel is for railroad car wheels, in which strength, simplicity, and integrity are essential qualities, and elasticity is also desirable in a certain degree. The object is to secure comfort and steadiness in transportation, with elasticity as near as possible to the initial jar or jolt, without sacrificing strength or other essential qualities; and to absorb, relieve or overcome jars, pounding and irregularities of motion imparted to the rim, tire, or flange, caused by the inequalities in the surface of the rails and imperfect connections at the ends of the rails, and to prevent their communication from the rim to the hub or axle of the wheel; and further, to make the spokes, hubs, axles, and lower part of the trucks a live instead of a dead weight.

A secondary use of my metallic wheel is for heavy trucks and other vehicle wheels, in which sufficient elasticity has not heretofore been secured without the attendant objectionable features of multiplicity of parts, and the use of wood or other destructible, derangeable, or non-metallic material. And the object is to provide a strong, integral, unitary, resilient vehicle wheel; and to avoid the use of bolts, nuts, screws, pins, wires, strips, rings, and other multiple, movable or derangeable parts; and to avoid the use of wood or other non-metallic substances.

The above objects are attained primarily as illustrated in the accompanying drawings, embodying the principles of my invention, to which reference is made by numerals.

Figure 1:
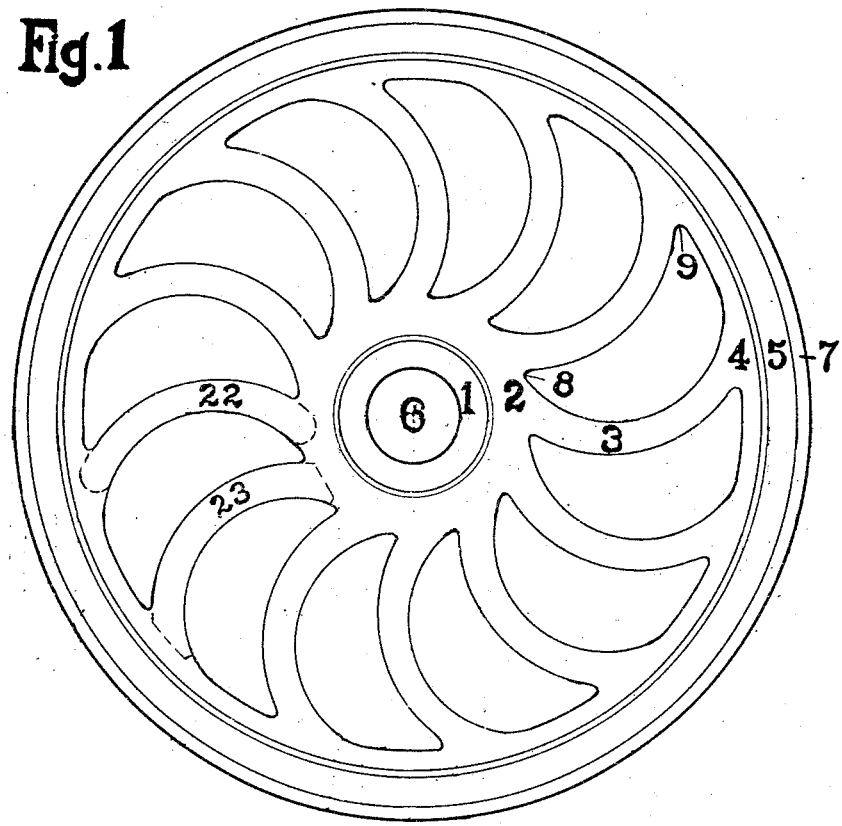
Figure 1 is a side view of my improved wheel.

The side elevation shown in Fig. 1 shows a unitary, resilient steel wheel, with concave spokes, longitudinally curved, and continuous with the hub and rim. Number 1 is a smooth face of the inner part of the hub, and 2 is the concave outer part of the hub. 3 is one of a plurality of concave, longitudinally curved spokes, which are thicker at either end than near the middle, or of a greater cross section terminally than medially, and also filleted at both ends, as shown at 8 and 9, to avoid all sharp angles and fractures tending to result therefrom, and continuous with the hub and rim. 4 is the concave inner rim, and 5 is the smooth or straight outer part of the rim, or tire which may be integral or shrunk on or otherwise attached. 6 is the axle, which may be free or fixed. 7 represents a flange or flange-like extension, continuous with the tire or rim.

Figure 2:
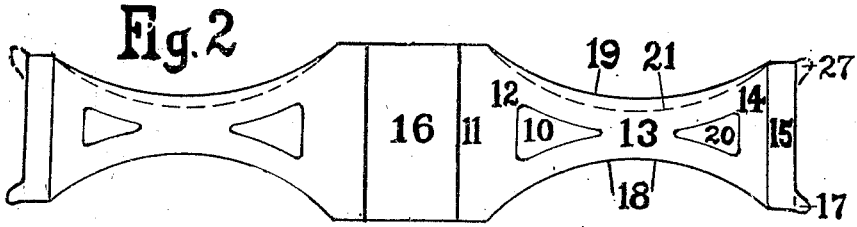
Fig. 2 is a diametrical section thereof.

The diametrical section of the wheel in Fig. 2 shows the concave formation of the spokes, which gradually grow narrower toward the middle, as shown at 13, and wider toward the hub, 11, and the rim or tire 15, the spokes being of a smaller cross section medially than terminally, and continuous with the hub at 12, and the rim at 14. 15, like 5, represents the outer part of the rim or tire. 15, without the flanges 17 and 27, represents the contour of a rim or tire adapted to plain wheels.

In Fig. 2, the curved lines, 18 and 19, show a special variation in the concave curvature for the inner and outer sides of a rail car wheel, the inner side having greater concavity and the outer less, whereby the spoke is best adapted to receive the flange thrust in operation. The dotted line 21, within the line 19, is symmetrical with 18, and illustrates how the spoke may be lightened and rendered more elastic by increasing the concavity of the spokes, either in the original pattern, or by subsequent machining of the disk or casting. The dotted line 21, together with the symmetrically curved line 18 also illustrate, in conjunction with the double flange 17 and 27, a more elastic and lighter type of wheel adapted to trucks and other vehicles. Numbers 10 and 20 indicate open, filleted, triangular spaces, or other similar cavities dividing the spokes, to further lighten the weight of the wheel and increase its resiliency.

The wheels represented in Figs. 1 and 2, and described by numbers 1 to 21 inclusive, are cast entire, from steel, substantially in the form set forth; or are cut, stamped, pressed, formed or machined from heavier or rougher castings, or forged or rolled steel, or from steel disks following the general form or thickness of the wheel.

The completed casting or die is annealed, tempered or heat-treated in whole or in part; and the spokes are specially tempered or heat-treated in whole or in part, by imparting excessive heat to the spokes or their medial portion and by more rapidly cooling them in a special bath or stream, than the hub or rim, and thereafter drawing them to the desired temper; and the rim or tread may be specially chilled or hardened, to withstand wear.

High carbon steel spokes, such as 22 or 23, with suitable rounded ends, or otherwise formed or finished for casting integrally, may be placed in the mold in their proper radial position, and cast into the hub and rim.

In all cases the completed wheel proper is one continuous, integral piece of metal; and adaptability to various uses is secured in the original casting, pattern, die, or design, or in the machining or finishing. Subsequent adjustability in operation is not intended, since that feature necessarily involves a multiplicity of parts. The relative amount of resiliency and strength required is determined and secured by the kind of steel used, and by the subsequent annealing, tempering, or heat-treatment employed, and the form, thickness, curvature, and concavity of the spokes.

The rim may be reinforced or surrounded by a shrunk-on steel tire, or a metallic tire laid in the mold; and the hub may be protected by suitable housing, boxing, bushing, or special bearing of other metal than the hub proper, cast, welded, or otherwise fitted into the hub proper.

Figure 3:
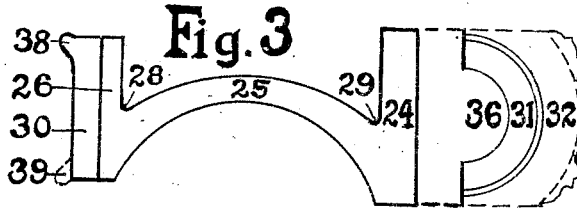
Figs. 3 and 4 show certain modifications.

The half diametric section of Fig. 3 illustrates a unitary resilient metallic wheel, with concave spokes which are latitudinally curved, but otherwise similar to the wheels above described and illustrated in Figs. 1 and 2. Number 24 is the hub, and 26 the inner part of the rim, and 25 is one of a plurality of concave, latitudinally curved, resilient spokes, which are thicker at either end than near the middle, or of a greater cross section terminally than medially, and filleted at both ends, as indicated at 28 and 29, and continuous with the hub and rim. 30 is the outer part of the rim, or tire, similar to 15. 38 and 39 represent flanges similar to 17 and 27.

Figure 4:
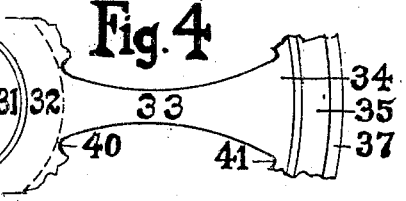

The segment in Fig. 4 is of the same wheel as in Fig. 3, showing the concave formation of the spokes. 31, like 1, represents the inner straight hub, and 32, like 2, the outer part of the hub, which is continuous with the spoke; and 33 is a side elevation of a latitudinally curved spoke, showing its concave formation, having a smaller cross section medially than terminally, and gradually growing narrow toward the middle of the spoke, and wider toward the ends, and corresponding to 25 in Fig. 3. 34 is the inner rim, similar to 4, and continues with the spoke 33; and 35 is the outer rim, or tire, similar to 5. 36 is the axle, similar to the axle 6, and 37 is a flange, similar to the flange 7.

Having thus described the nature and object of my invention, what I claim as new and desire to secure by Letters Patent is:—

1. An integrally unitary, resilient, steel vehicle wheel, comprising a plurality of alike, resilient, concave, curved, steel spokes, which are continuous with the hub and rim, and which have smaller cross sections medially than terminally.

2. An integrally unitary, resilient, steel vehicle wheel, comprising a plurality of alike, resilient, concave, steel spokes, longitudinally curved in the plane of the wheel, which are continuous with the hub and rim, and which have a smaller cross section medially than terminally.

3. An integrally unitary, resilient, steel vehicle wheel, comprising a plurality of alike, resilient, concave, steel spokes, latitudinally curved in the planes passing through the axis of the wheel and said spokes, and which are continuous with the hub and rim, and which have a smaller cross section medially than terminally.

4. An integrally unitary, resilient, steel vehicle wheel, cast entire from steel, or cut, stamped, pressed, formed or machined from heavier or rougher castings or forged or rolled steel, plates, or disks of the general form or thickness of the wheel; comprising a steel hub, a steel rim, and a therewith integrally unitary plurality of alike, longitudinally or latitudinally, curved, resilient, steel spokes, which are continuous with the hub and rim, and which are concave, having a minimum cross sectional area in their medial portion, and gradually increasing to a maximum cross sectional area terminally, and filleted terminally to avoid sharp angles.

5. A resilient steel vehicle wheel, comprising a steel hub, a steel rim, and a therewith integrally unitary plurality of alike curved steel spokes, the medial cross sectional areas of which are smaller rectangles, polygons, ovals, or circles, than the corresponding symmetrical cross sectional areas of said spokes taken nearer to said hub or rim.

6. A resilient steel vehicle wheel, comprising a steel hub, a steel rim, and a therewith integrally unitary, co-cast or inter-cast, plurality of alike, longitudinally or latitudinally curved, steel spokes, the area of the central cross sections of which are less than the cross sections thereof taken nearer to said hub or rim.

7. A resilient steel vehicle wheel, comprising a steel hub, a steel rim, and a therewith integrally unitary, co-cast, or inter-cast, plurality of alike, longitudinally or latitudinally curved, separate, round or oval steel spokes, the constituent metal of which is medially of said spokes integrally more resilient than in portions thereof more proximate to said hub or rim.

8. A resilient steel wheel, comprising a steel hub, a steel rim, and a therewith integrally unitary, co-cast, or inter-cast, plurality of alike, longitudinally or latitudinally curved, steel spokes, the areas of central cross sections of which are less than cross sections thereof taken nearer to said hub or rim, and the constituent metal of which is medially of said spokes integrally more resilient than in portions thereof more proximate to said hub or rim.

9. A resilient steel vehicle wheel, comprising a steel hub, a steel rim, and a therewith integrally unitary, co-cast or intercast, plurality of alike, concave, curved, steel spokes, which are more highly tempered and resilient, or of a higher carbon content, and capable of higher temper than the constituent metal of the hub and rim.

10. A resilient steel automobile or railway car wheel, of the type set forth in the sixth claim, in combination with a single or double flange, or flange extension, continuous with the tire or rim.

11. A resilient steel vehicle wheel of the type set forth in the sixth claim, said spokes having open, filleted triangular spaces, or other similar cavities, near the ends of the spokes.

12. A resilient steel railway car wheel of the type set forth in the sixth claim, said spokes being unequally concave on the opposite sides of the wheel.

13. An integrally unitary resilient steel car wheel, comprising a plurality of alike, latitudinally curved, or longitudinally curved, resilient steel spokes, which are unequally concave on the opposite sides of the wheel, and which are continuous with the hub and rim, and which have smaller cross sections medially than terminally, and which are filleted terminally; and an outer straight rim, or tire, shrunk on, and provided with a continuous flange extension.

14. A resilient metallic wheel, of the type set forth in the sixth claim, said spokes having a high carbon content, specially tempered, in whole or in part, by excessive heat and more rapid cooling than the hub or rim.

In testimony whereof, I have signed my name to this specification in the presence of two witnesses.

PAUL H. DODGE.

Witnesses:
 AVON R. NOTTINGHAM,
 BETHEL HARMESON.